US008166098B1

(12) United States Patent  
Reardon (10) Patent No.: US 8,166,098 B1
(45) Date of Patent: Apr. 24, 2012

(54) SYSTEM AND METHOD FOR DYNAMICALLY CAPTURING DIGITAL IMAGES FROM IMAGE CAPTURE DEVICES

(75) Inventor: George R. Reardon, Lawrenceville, GA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 2528 days.

(21) Appl. No.: 10/171,693

(22) Filed: Jun. 17, 2002

(51) Int. Cl. *G06F 15/16* (2006.01)

(52) U.S. Cl. ........ 709/202; 709/248; 348/207.1; 348/211.3; 348/231.99; 348/231.2

(58) Field of Classification Search .......... 709/217, 709/206, 207, 219, 202, 248; 348/207.1, 348/207.11, 211.99, 211.2, 220.1, 211.3, 348/231.99, 231.2

See application file for complete search history.

(56) References Cited

U.S. PATENT DOCUMENTS

| | | | |
|---|---|---|---|
| 6,535,243 B1* | 3/2003 | Tullis ............... | 348/207.1 |
| 6,571,271 B1* | 5/2003 | Savitzky et al. ..... | 709/200 |
| 6,636,259 B1* | 10/2003 | Anderson et al. .... | 348/211.3 |
| 6,670,982 B2* | 12/2003 | Clough et al. ...... | 348/14.02 |
| 6,690,416 B1* | 2/2004 | Silverbrook ........ | 348/207.2 |
| 6,710,780 B2* | 3/2004 | Ma ................. | 345/607 |
| 6,715,003 B1* | 3/2004 | Safai ............... | 710/33 |
| 6,788,332 B1* | 9/2004 | Cook ............... | 348/14.02 |
| 6,812,961 B1* | 11/2004 | Parulski et al. .... | 348/231.2 |
| 6,812,962 B1* | 11/2004 | Fredlund et al. .... | 348/231.2 |
| 6,888,569 B2* | 5/2005 | Fox et al. ......... | 348/239 |
| 6,891,567 B2* | 5/2005 | Steinberg .......... | 348/211.99 |
| 6,995,789 B2* | 2/2006 | McIntyre et al. .... | 348/207.1 |
| 7,034,880 B1* | 4/2006 | Endsley et al. ..... | 348/333.11 |
| 2001/0045985 A1* | 11/2001 | Edwards et al. ..... | 348/231 |
| 2003/0009569 A1* | 1/2003 | McIntyre et al. .... | 709/229 |
| 2003/0103144 A1* | 6/2003 | Sesek et al. ....... | 348/207.1 |
| 2004/0201709 A1* | 10/2004 | McIntyre et al. .... | 348/211.2 |

* cited by examiner

*Primary Examiner* — David Lazaro (74) *Attorney, Agent, or Firm* — Parks IP Law LLC; Jennifer P. Medlin, Esq.

(57) ABSTRACT

An image capture device is wirelessly coupled to a network to facilitate distribution of captured images. The image capture device captures and stores digital images. The image capture device is adapted to determine whether there is an accessible network. If there is an accessible network, the image capture device the image to a network storage device for distribution to one or more recipients. A user can also modify, review and/or delete captured images.

15 Claims, 5 Drawing Sheets

| | IMAGE | SENT | REVIEW | APPROVAL | AUTO-DELETE | DISTRIBUTION LIST |
|---|---|---|---|---|---|---|
| | 402 | 404 | 406 | 408 | 410 | 412 |
| 414 | A | SET | SET | SET | SET | 1 |
| 416 | B | RESET | SET | RESET | SET | 1 |
| 418 | C | RESET | SET | SET | RESET | 2 |

SYSTEM AND METHOD FOR DYNAMICALLY CAPTURING DIGITAL IMAGES FROM IMAGE CAPTURE DEVICES

BACKGROUND

1. Field of the Invention

The present invention relates generally to devices for capturing, storing, and distributing images. More particularly, the present invention relates to transmitting images captured from an image capture device to recipients.

2. Background of the Invention

Portable cameras have long been available for personal and professional use. During that time, advances in photography have made such portable cameras easier and more convenient to use. These advances include nearly instantaneous film development, disposable cameras, and reduction in size and weight of cameras.

Recently, the digital camera has revolutionized the portable camera market. Exemplary digital cameras include the Nikon Coolpix family of cameras available from the Nikon Corporation (Melville, N.Y.) and the Canon Powershot family of cameras available from the Canon Corporation (Lake Success, N.Y.). Digital cameras do not use conventional film to record images. Instead, they use an image sensor to capture images. The captured images are stored on a memory card, disk, or other data storage device. Digital cameras allow users to download captured images to personal computers. These downloaded images can be printed or distributed to others. Downloading images directly from the camera allows users of digital cameras to bypass the often time-consuming processes associated with developing the film. Moreover, digital cameras generally provide users with the additional benefit of being able to preview images when they are taken and deleting unwanted images.

Though digital cameras enable users to see their images more quickly, there is usually a significant delay from when images are taken to when they are distributed to others. For example, in conventional systems when a digital photo, video or other image is created, several steps are necessary to distribute the image. The image must be downloaded to a network connected device (usually a PC). After the image is downloaded, the image must either be posted to a storage device that is accessible to intended recipients or sent electronically to intended recipients, for example, by e-mail.

Unfortunately, most users of digital cameras are not closely located to a network-connected device when they create an image. Consequently, captured images stored in the digital camera cannot be downloaded quickly. Moreover, even where the user has access to a network-connected device, the user's camera may not be capable of communicating with the device to download stored images. For example, the drivers that are needed to allow the PC and the digital camera to communicate may not be available on a PC that is accessible to the user.

Wireless technologies are emerging that allow users to access networks such as pager networks, telephone networks, and the Internet without being tethered by a wire to a network-connected device. Examples of wireless network standards include IEEE 802.11b and IEEE 802.11a. IEEE 802.11a and IEEE 802.11b are standards for Wireless LANS (WLANs) that operate in the 2.4 GHz radio frequency using Direct Sequence Spread Spectrum (DSSS). IEEE 802.11a and IEEE 802.11b provide performance for wireless networks comparable to that provided to wireline networks using Ethernet.

Another wireless technology that is gaining in popularity is Bluetooth™ Bluetooth™ uses short-range radio links to create networks between Bluetooth™ devices. The goal of the Bluetooth™ technology is to allow any Bluetooth™-capable device anywhere in the world to connect to any other Bluetooth™-capable device in its proximity, regardless of brand.

These wireless technologies provide mobile freedom and flexibility not possible in wireline networks. However, these advantages have not been fully realized in the context of image-capture devices such as digital cameras.

SUMMARY OF THE INVENTION

The present invention addresses these and other needs in the industry by facilitating distribution of images captured from digital image capture devices. In one embodiment, the present invention is a system that comprises an image capture device that captures and stores digital images. The device is adapted to determine whether there is a network accessible to it. If there is such a network, the device sends a captured image to a network storage device on the network for distribution to intended recipients.

In another embodiment, the present invention is a method for storing digitally captured images on a digital imaging device. The method includes the step of determining whether one or more images has not been sent. If there are unsent images, the method continues with the step of determining if a network is available. If there is a network available the method continues with the steps of sending and storing the images on the network storage device. The method then continues with the step of receiving an indication that the images have been stored.

DETAILED DESCRIPTION OF THE INVENTION

Figure 1:
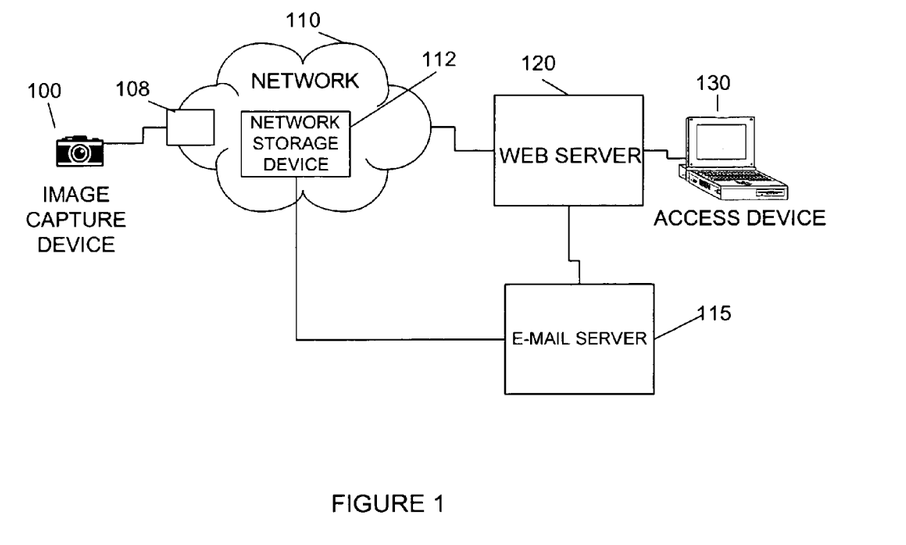
FIG. 1 is a schematic diagram showing a system for dynamically capturing digital images according to an embodiment of the present invention.

FIG. 1 is a schematic diagram showing a system for facilitating distribution of digital images captured by an image capture device according to an embodiment of the present invention. As described more fully below, the system shown in FIG. 1 enables near real time viewing of digital images when they are taken without requiring additional manual steps to be performed by a user of the digital image capture device. A user captures images with a image capture device 100. For example, where digital image capture device is a digital camera, the user can take a picture to capture the digital image. Digital image capture device 100 can communicate with a network 110. Network 110 can be any network including a LAN, a WAN, the Internet, an interne, an intranet, satellite networks as well as combinations of these types of networks.

Preferably, the communication is wireless. Exemplary wireless communication standards for carrying out this communication include wireless fidelity (Wi-Fi) standards such as IEEE 802.11a and IEEE 802.11b, the Bluetooth™ standard and satellite communication standards. For example, in one embodiment of the present invention, digital image capture device 100 communicates with a satellite to upload images to the satellite. The satellite then downloads the images for storage on the Internet so they can be accessed by recipients, e-mailed to recipients or otherwise distributed to recipients.

Digital image capture device 100 can be any type of device that can capture images and can be adapted to communicate with network 110. Exemplary digital image capture devices include digital cameras, digital video cameras, digital medical imaging devices, and other devices that can capture images.

In operation, when image capture device 100 has images to transmit, it attempts to detect the presence of a network 110. This can be accomplished in a umber of well-known ways. For example, image capture device 100 can transmit polling signals. A network access device 108 that enables access to network 110 can respond to the polling signal if it is present within range of image capture device 100. If image capture device 100 receives a response to its polling signal, it will attempt to download images to network 110 for distribution to recipients.

Downloaded images can be stored in a network storage device 112. Network Storage device 112 can be accessed by an e-mail server 115 that can incorporate the images into one or more e-mail messages to be sent to intended recipients. The intended recipient can access the e-mail, for example, using an access device 130 through a web server 120. In addition, network storage area 112 can be accessed as a bulletin board or other database by an intended recipient. Generally, this access is obtained using access device 130 to gain access to network 110. For example, this access can be obtained through web server 120. Exemplary access devices include personal computers ("PCs") and personal digital assistants ("PDAs").

Figure 2:
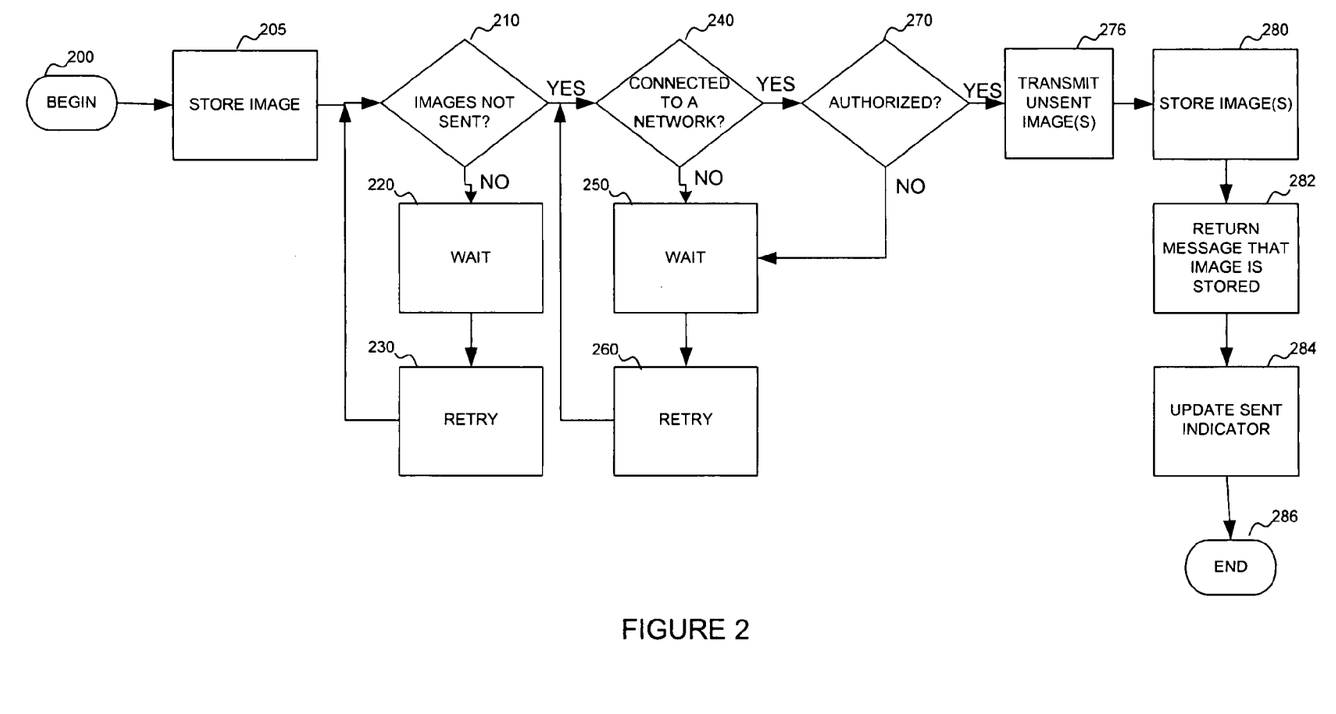
FIG. 2 is a flow chart of a method by which the device will store and send images.

FIG. 2 is a flow chart illustrating a method for storing and distributing digital images according to an embodiment of the present invention. The method begins in step 200. In step 205, an image is stored into an image capture device. The image can be stored, for example, by a user of a digital camera taking a picture. When the image is captured and stored in the image capture device, an indicator is established that indicates the existence of an image in the image capture device. Such an indicator can be an image flag that is set whenever an image exists in the image capture device. The image flag is reset if no image exists. For example, the image flag can be reset when all the images have been deleted.

In addition to the image indicator, preferably each image has a corresponding sent indicator. The sent indicator indicates whether the image has been sent or not. As with the image indicator, the sent indicator can be a sent flag that is set if its corresponding image has been sent and reset if the image has not been sent. In other embodiments of the present invention, the sent indicator corresponds to a plurality or all of the captured images. In these embodiments of the present invention, the plurality or all of the captured images can be sent at one time, depending on the state (set or reset) of the sent indicator.

In one embodiment of the present invention, transmittal of captured images is controlled by the user of the image capture device. For example, the user of the image capture device can set an approval indicator (described below) that allows the image capture device to transmit one or more captured images. As described below, an approval indicator can be associated with one or more of the captured images.

Captured images can be sent in any desired order. Preferably, captured images are sent in order of oldest (i.e., first captured) to youngest (i.e., last captured). Where an approval indicator (described below) is used to indicate which images are approved for transmittal, the ordering applies only to those images for which the approval indicator has been set, i.e., only those images that are to be sent. Any other order, including an arbitrary order selected by the user of the image capture device, can be established for transmitting the captured images.

When at least one image has been captured (e.g., as determined by a query of the image indicator), in step 210 the image capture device determines whether there are any captured images that have not been sent. This can be accomplished by querying the status of the sent indicator associated with each captured image. If all of the captured images have been sent (i.e., the sent indicator corresponding to each captured image is in the RESET state), the image capture device enters a wait state for a pre-determined amount of time in step 220. Preferably, the pre-determined amount of time is user-selectable. During the wait state new images can be captured by the image capture device. For example, where the image capture device is a digital camera, new pictures can be taken during the wait state. After the pre-determined amount of time has elapsed, the image capture device reactivates in step 230 and continues in step 210 by determining whether any images exist that have not been sent.

If there are images that have not been sent, the method continues in step 240 where the image capture determines if there is an accessible network. Preferably, the image capture device automatically initiates an inquiry to find out if there are any network access devices within its range. For example, the image capture device can send out a polling signal requesting a response from a network access device that provides access to an accessible network. In another embodiment of the present invention, images are uploaded to a satellite for distribution to recipients. In this embodiment, the satellite can download the images to a network storage device on the Internet for distribution to the recipients.

If there is no network access device within its range, the image capture device cannot connect to a network. In that case, the image capture device enters a wait state for a pre-determined amount of time in step 250. Preferably, the pre-determined amount of time is user-selectable. The amount of time spent in the wait states in steps 220 and 250 can be, but need not be, the same. During this wait state, the image capture device may come within range or a network access device. After the pre-determined amount of time has elapsed, the image capture device retries its attempt to establish communication with a network access device to connect to an accessible network.

If the image capture device is able to communicate with a network access device, it connects to the network. In step 270, the network determines whether the user or the image capture device is authorized to access the network. Preferably, this determination is made using authorization information transmitted by the image capture device when it attempts to connect to the network. For example, the authorization information can be a username and password that is pre-stored in the image capture device.

If the user is not authorized to use the network, the image capture device enters the wait state in step 250 to provide the user time to come within range of a network on which the user is authorized to download images. The image capture device will reactivate its search for an available network in step 260 after the pre-determined amount of time has elapsed as described above.

If the user is authorized to use the network, the method continues in step 276 where the image capture device transmit images that have not been previously transmitted to a network storage device. The images are stored on the network storage device in step 280. Once stored on the network storage devices, the images can be forward to intended recipients by, for example, e-mail. Alternatively, the images can be accessed by authorized recipients. For example, the images could be stored in a photo folder of a service such as Yahoo. These images can be accessed by a pre-determined list of persons. Other distribution methods would be apparent to those skilled in the art.

When the image(s) have been stored, in step 282 the network storage device returns a message to the image capture device that indicates successful storage of the images. When the image capture device receives the message, it sets the sent indicator corresponding to image(s) stored in the network storage device in step 284. Alternatively, the image capture device can set the sent indicator, corresponding to image(s) it sends to the network storage device immediately upon sending the image(s). In this case, the image capture device does not wait for a message from the network storage device indicating the images have been successfully stored prior to updating the sent indicator(s) corresponding to the sent image (s). The method then ends in step 286.

In one embodiment of the present invention, the user is notified that the images have been sent and/or stored on the network storage device. For example, a status lamp can be lit or a message can be displayed to the user on a screen of the image capture device. In another embodiment of the present invention, an indication that a recipient has received the image(s) is provided to the user of the image capture device.

Figure 3:
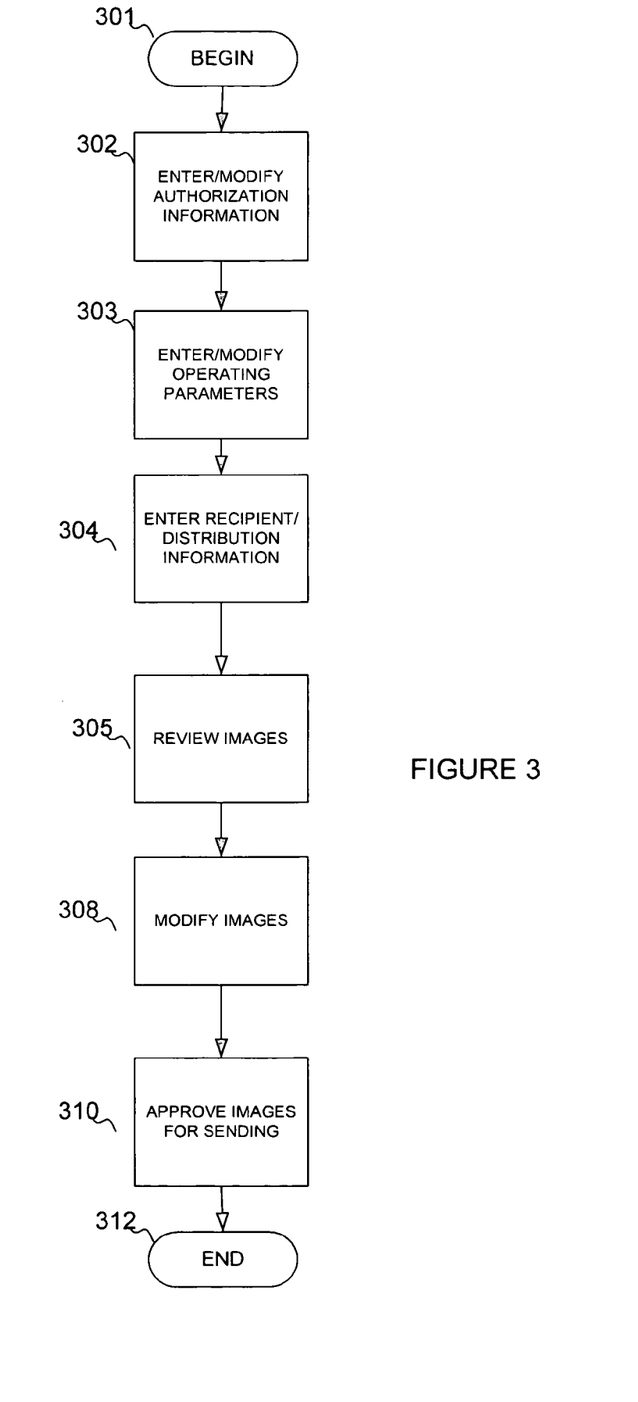
FIG. 3 is a flow chart of a method for managing images stored in a device for distribution according to an embodiment of the present invention.

FIG. 3 is a flow chart for a method for managing and customizing distribution of images captured by an image capture device according to an embodiment of the present invention. The method begins in step 301. In step 302, a user of a image capture device enters or modifies authorization information. This authorization information is required to access a network. As described above, the authorization information typically includes a user identification and a user password.

If desired, in step 303 the user can enter and/or modify operating parameters. For example, the user can set or modify the wait time for retrying the existence of an accessible network and/or for retrying connecting to an accessible network. Another parameter the user can enter in an embodiment of the present invention is an ordering parameter to control an order in which images are sent. For example, the order parameter can be an array wherein each element corresponds to a captured image stored in the image capture device. The value stored in each array element provides the order for transmitting the corresponding captured image.

In step 304, the user can enter a distribution list. Preferably, the distribution information is a list of recipients to which the image(s) are to be transferred. The distribution list is sent to the network storage device or other network device that controls distribution of the images to recipients. The network storage device accesses the distribution list and forwards the image(s) in accordance therewith. For example, the distribution list can include web pages, handheld device addresses, computer addresses, addresses of a database accessible to recipients, e-mail addresses and/or other addresses or recipients. For example, when the distribution list includes e-mail addresses, the network storage device coordinates with an e-mail server to send the images to the intended recipients.

The distribution list can also be a list of recipients that can access the images. For example, if the network storage device is a personal folder such as a Yahoo photo folder, the distribution list can be a list of those persons authorized to view the image(s).

In another embodiment of the present invention, more than one distribution list is sent to the network storage device. For example, distribution lists can be created for friends, family, co-workers and any other desired group. Moreover, different image(s) can be assigned to different distribution lists. This provides flexibility and efficiency by permitting distribution for different sets of images to be controlled by different distribution lists.

The distribution list can also be an address or other identifier of a location of a user's address book. For example, if the user maintains a web accessible address book, the user can provide the web address of the address book as the distribution list. The network storage device accesses the address book to obtain the e-mail addresses of the recipients to which the images are to be forwarded.

The user can also set the distribution list as a default. If the user frequently sends the images to the same address or set of addresses, the user may desire to set that address or set of addresses as the default distribution list.

In step 306 the user reviews any images he or she desires to review prior to sending them to the network storage device for distribution. The image capture device can also be configured to send images when they are captured without prior review.

In step 308 the user modifies any captured image if such modification is desired. For example, the user can change coloration of the images, crop the images, adjust the size and brightness of images, and/or add text or a message to the images.

In step 310 the user, approves the images for sending. This can be done by the user pressing an "OK" button or other acceptance indicator on the image capture device. In one embodiment, approval by the user sets an approval indicator. An approval indicator is associated with each image to be sent. For example, the approval indicator can be an approval flag that is set when an image is approved to be sent and reset when the image is not approved for sending. Prior to sending images to the network storage device the image capture device queries the approval indicator associated with the image being sent. The image capture device sends only those images for which the approval indicator is set.

In an embodiment of the present invention, date and time information can be sent with the images. Preferably, the date and time information corresponds to the date and time when the images were captured. This information can be obtained from information that is stored in the image capture device when the image is captured. In addition, date and time information corresponding to when the images are transmitted to a network for distribution can be sent with the transmitted images.

In one embodiment of the present invention, the user can set the approval indicator for one or more images at a time. For example, the user can set the approval indicator corresponding to all captured images rather than each image individually.

In another embodiment of the present invention, the user verifies his or her authority to send images prior to being allowed to send images. In this embodiment, the image capture device preferably prompts the user for a user identification and a password, prior to sending any images. The user must enter the correct password to send the images. The password protection provides a level of security against unauthorized access to and transmittal of captured images.

Figure 4:
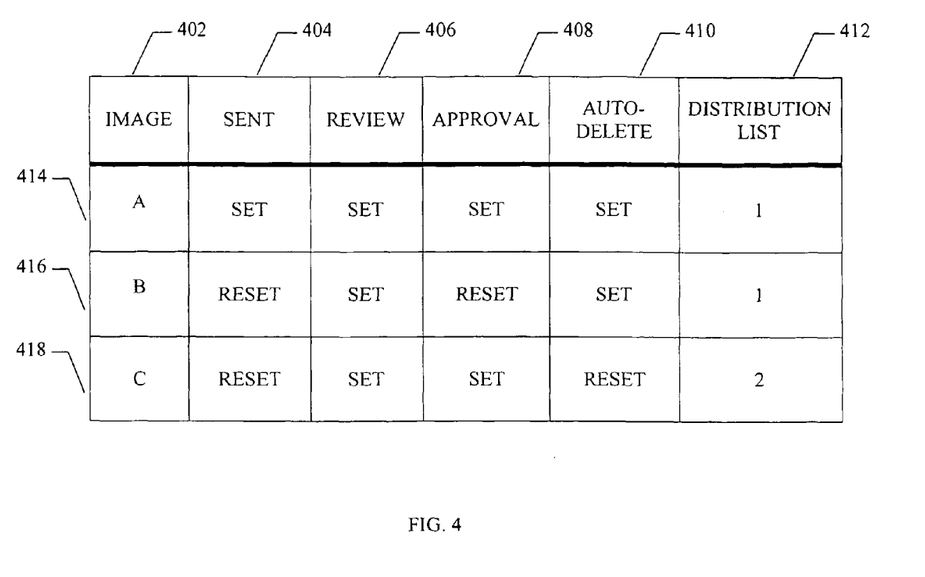
FIG. 4 is a schematic diagram of the image management system according to an embodiment of the present invention.

FIG. 4 illustrates an exemplary table 400 for managing distribution of captured images according to an embodiment of the present invention. Table 400 can be stored in an image capture device such as image capture device 100. In the example illustrated in FIG. 4, there are three captured images, A, B and C. Each image has associated with it a sent indicator (column 404), a review indicator (column 406), an approval indicator (column 408), an auto-delete indicator (column 410) and a distribution list identifier (column 412). Row 414 corresponds to the information associated with image A. Row 416 corresponds to the information associated with image B. Row 418 corresponds to the information associated with image C.

The sent indicator in column 404 of table 400 indicates whether an image has been sent to a network storage device. As described above, the sent indicator can alternatively be used to indicate whether the image was actually stored by the network storage device. If the value of the sent indicator is "SET," the image was sent to (and/or, stored in) the network storage device. If the value of the sent indicator is "RESET," the image has not been sent to (and/or, stored in) the network storage device. Preferably, the default value of the sent indicator is "RESET." In the example illustrated in FIG. 4, only image A has been sent to (and/or, stored in) the network storage device.

The review indicator in column 406 of table 400 indicates whether the image has been reviewed by the user. If the value of the review indicator is "SET," the corresponding image has been reviewed by the user. If the value of the review indicator is "RESET," the corresponding image has not been reviewed by the user. Images A, B and C have been reviewed by the user in the example shown in FIG. 4.

The approval indicator in column 408 indicates whether the user has approved the image for sending to the network storage device. If the value of the approval indicator is "SET," the corresponding image has been approved for sending to the network storage device. If the value of the review indicator is "RESET," the corresponding image has not been approved for sending to the network storage device. Images A and C have been approved for transmittal to the network storage device by the user in the example shown in FIG. 4.

The auto-delete indicator indicates whether the user desires that the corresponding image be deleted automatically after it is sent to (and/or, stored in) the network storage device. If the value of the auto-delete indicator is "SET," the corresponding image is to be automatically deleted when the image is sent to (and/or, stored in) the network storage device. If the value of the auto-delete indicator is "RESET," the corresponding image is not to be automatically deleted when the image is sent to (and/or, stored in) the network storage device. In the example shown in FIG. 4, images A and C will be deleted automatically when they are sent to (and/or, stored in) the network storage device.

The distribution list value is an identifier that identifies a particular distribution list to be used to distribute the corresponding image. This value is not required if there is only one distribution list. As shown in FIG. 4, for example, images A and B are to be distributed according to distribution list 1, and image C is to be distributed according to distribution list 2.

Figure 5:
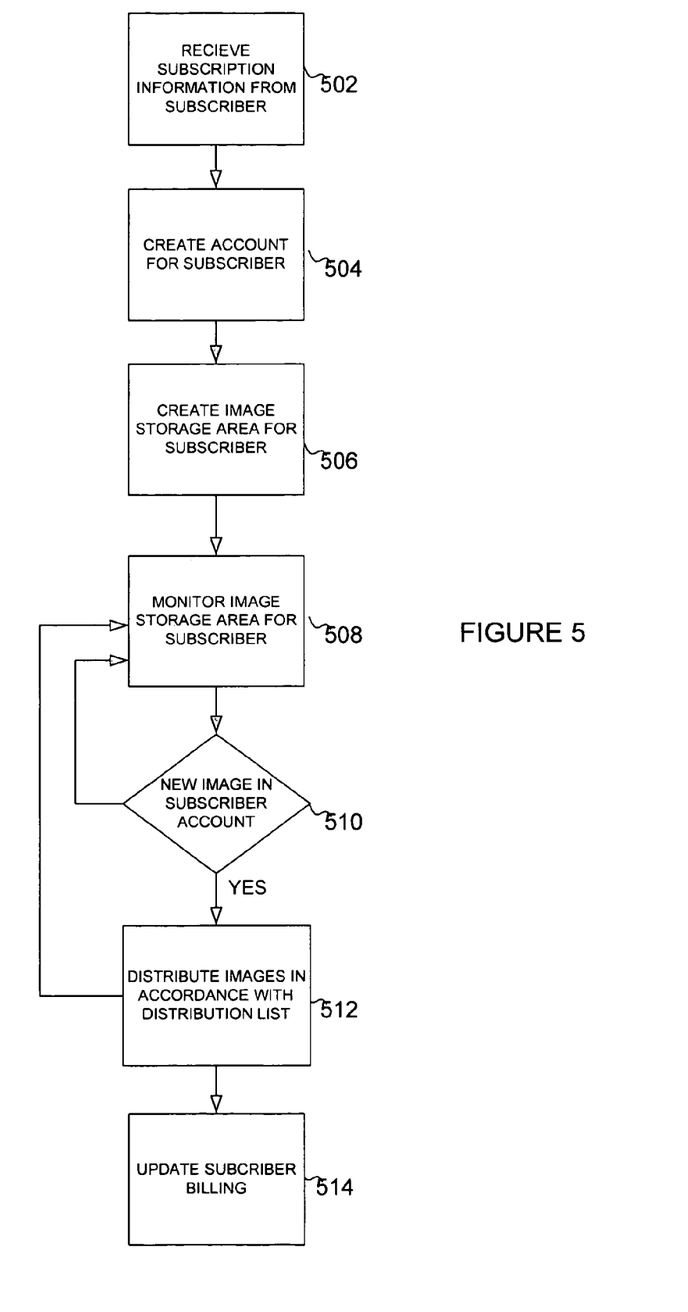
FIG. 5 is a flow chart for a network service provider that detects digital image capturing devices.

FIG. 5 is a flow chart illustrating a service that can be offered on a subscription basis for providing subscribers with the ability to distribute captured images according to an embodiment of the present invention. Such a service might be offered, for example, by a manufacturer or reseller of image capturing devices. Another potential service provider is an Internet Service Provider (ISP) who might offer the service to their subscribers either for a fee or as an additional feature of their service. Other possible service provider types would be apparent to those skilled in the art.

In step 502, a service provider receives a subscription request along with subscription information from a subscriber. The subscription information includes identification information, image distribution lists, and billing preferences. The subscription information can be received in a number of ways. For example, the subscription information can be received by telephone, mail, over a network such as the Internet using e-mail or a web page, or any other manner of receiving the subscription information.

When the information is received, the service provider creates an account for the subscriber in step 504. In step 506, the service provider creates an image storage area. The image storage area serves a similar purpose as described above for network storage device 112. The service provider can bill on the basis of the amount of storage provided for or requested by the subscriber.

In step 508, for each subscriber, the service provider monitors the storage area associated with the subscriber for new images. If there are no new images in the subscriber's storage area as determined in step 510, the service provider continues to monitor each subscriber's storage area.

If there is a new image in a particular subscriber's storage area, the method continues in step 512 where the new images are distributed in accordance with the distribution list or lists provided by the subscriber. There are numerous ways to distribute the images. For example, the images can be e-mailed to recipients using email addresses provided in the distribution list(s). Alternatively, the images can be posted in an accessible storage area for viewing by authorized subscriber whose identities are provided in the distribution list(s). Other distribution methods would be apparent to those skilled in the art.

In step 514, billing is updated for the subscriber based on the images distributed. Preferably, billing is done according to billing preferences supplied by the subscriber in the subscription information. Billing can be performed in a number of ways, including for example, billing on a monthly basis to use the service, billing on a per use of the service basis, billing based on the number of images distributed, billing based on bundles of images distributed, billing based on number of distribution lists supported, billing based on numbers of addresses in one or more distribution lists, and combination of these billing models. These exemplary billing models are provided by way of example only. Other billing paradigms would be apparent to those skilled in the art.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for distributing one or more images captured by a wireless image capture device, comprising:
   (a) determining whether an image captured by the wireless image capture device has or has not been sent to a network storage device;
   (b) if an image has not been sent to the network storage device, determining whether a network for distributing the image to at least one recipient is available; and
   (c) if there is a network available, the method further comprising steps of:
      (c.1) after having determined that the network is available, then connecting the wireless image capture device to the network;
      (c.2) sending the image from the wireless image capture device to the network for storage on the network storage device;
      (c.3) receiving an indication at the image capture device from the network storage device that the image has been stored; and
      (c.4) automatically deleting the image after receiving the indication that the image has been stored based on the value of a first indicator set by a user of the wireless image capture device and not automatically deleting the image after receiving the indication that the image has been stored based on the value of a second indicator set by the user of the wireless image capture.

2. The method of claim 1, wherein determining whether a network for distributing the image to at least one recipient is available comprises transmitting a wireless connectivity status signal from the wireless image capture device to a network access device, wherein if the network access device responds to the wireless connectivity status signal, then the network is within a range of the wireless image capture device.

3. The method of claim 1, wherein the image is automatically sent to the network substantially in real time after being captured and without prior review by the user.

4. The method of claim 1, further comprising modifying the captured image on the wireless image capture device before sending it to the network.

5. The method of claim 1, further comprising adding the text to the captured image on the wireless image capture device.

6. The method of claim 1, further comprising modifying a size of the captured image on the wireless image capture device.

7. The method of claim 4, further comprising modifying a coloration of the captured image on the wireless image capture device.

8. The method of claim 1, further comprising storing the image on a hard drive of a personal computer.

9. the method of claim 1, further comprising sending the image to a personal digital assistant (PDA).

10. The method of claim 1, further comprising sending the image to an e-mail address.

11. The method of claim 10, further comprising:
   generating, on the wireless image capture device, a distribution list comprising a plurality of e-mail addresses in a web accessible address book to which to send the image; and
   sending the image to each of the e-mail addresses in the distribution list.

12. The method of claim 1, further comprising sending the image to a web page.

13. The method of claim 1, further comprising accessing the image after it has been sent and stored.

14. The method of claim 13, further comprising accessing the image by viewing it on a personal computer.

15. The method of claim 1, wherein sending the image from the wireless image capture device to the network for storage on the network storage device comprises sending the image from the wireless image capture device to an image storage area for storing images received from a subscriber, wherein the size of the image storage area is based on the amount of a subscription fee paid by the subscriber.

* * * * *